United States Patent
Chen et al.

(10) Patent No.: US 10,324,698 B2
(45) Date of Patent: *Jun. 18, 2019

(54) SOFTWARE INSTALLATION ONTO A CLIENT USING EXISTING RESOURCES

(71) Applicant: International Business Machines Corporation, Armonk, NY (US)

(72) Inventors: Di Ling Chen, Beijing (CN); Chuang Li, Beijing (CN); Wei Lu, Beijing (CN); Yin Ben Xia, Beijing (CN); Zhe Xiang, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/948,326

(22) Filed: Nov. 22, 2015

(65) Prior Publication Data

US 2016/0085537 A1    Mar. 24, 2016

Related U.S. Application Data

(63) Continuation of application No. 13/788,139, filed on Mar. 7, 2013, now Pat. No. 9,940,117, which is a
(Continued)

(51) Int. Cl.
*G06F 8/61* (2018.01)
*G06F 9/4401* (2018.01)
(Continued)

(52) U.S. Cl.
CPC ............ *G06F 8/61* (2013.01); *G06F 8/63* (2013.01); *G06F 9/4408* (2013.01); *G06F 9/4416* (2013.01); *G06F 9/4406* (2013.01)

(58) Field of Classification Search
CPC ....................................................... G06F 8/30
See application file for complete search history.

(56) References Cited

U.S. PATENT DOCUMENTS 5,145,028 A   9/1992  Wai
5,715,456 A   2/1998  Bennett et al.
(Continued)

FOREIGN PATENT DOCUMENTS

CN       101399696 A    4/2009
WO    2011088714 A1    7/2011

OTHER PUBLICATIONS

U.S. Appl. No. 12/235,777, Non-Final Office Action, dated Nov. 2, 2011, 24 pg.
(Continued)

*Primary Examiner* — Li B. Zhen
*Assistant Examiner* — Mohammad H Kabir
(74) *Attorney, Agent, or Firm* — Cuenot, Forsythe & Kim, LLC

(57)    ABSTRACT

The present invention relates to a method and system for installing software onto a client in the NIM environment and corresponding client. Said method includes: initializing said client, wherein a virtual mapping device associated with a memory driver of the client is created, the virtual mapping device for scheduling between the client's memory driver and the remote NIM server with respect to the I/O operation for running the software so as to direct the I/O operation for running said software to the client's memory driver or the remote NIM server; running said software on the client; acquiring the resources desired for running software; and conducting data migration operation from the NIM server to the client while running said software, wherein the migrated data is the resource data obtained from NIM server and desired for installing said software; and the software installation being completed when all the data desired for install-
(Continued)

ing said software are migrated to the memory driver of the client. It is unnecessary for the present invention to copy all the installation images to the local client before installing software, therefore time delay of installing OSs or application programs can be shortened or even eliminated.

15 Claims, 12 Drawing Sheets

Related U.S. Application Data continuation of application No. 12/235,777, filed on Sep. 23, 2008, now Pat. No. 8,423,990.

(51) Int. Cl.
G06F 9/445 (2018.01)
G06F 9/00 (2006.01)

(56) References Cited

U.S. PATENT DOCUMENTS

| | | | |
|---|---|---|---|
| 5,897,664 A | 4/1999 | Nesheim et al. | |
| 6,094,531 A | 7/2000 | Allison et al. | |
| 6,145,028 A * | 11/2000 | Shank | G06F 3/0607 710/31 |
| 6,247,126 B1 | 6/2001 | Beelitz et al. | |
| 6,760,787 B2 * | 7/2004 | Forin | G06F 11/141 707/999.202 |
| 7,120,786 B2 | 10/2006 | Miller et al. | |
| 7,191,437 B1 | 3/2007 | Coatney et al. | |
| 7,333,227 B2 | 2/2008 | Seto | |
| 7,334,100 B2 | 2/2008 | Kobayashi et al. | |
| 7,356,679 B1 | 4/2008 | Le et al. | |
| 7,562,208 B1 | 7/2009 | Reed et al. | |
| 7,617,502 B2 | 11/2009 | Sprague | |
| 7,814,126 B2 | 10/2010 | Prabu et al. | |
| 7,925,737 B2 | 4/2011 | Hochmuth et al. | |
| 8,209,680 B1 * | 6/2012 | Le | G06F 17/30067 713/1 |
| 8,365,164 B1 | 1/2013 | Morgenstern | |
| 8,423,990 B2 | 4/2013 | Chen et al. | |
| 2002/0023225 A1 | 2/2002 | Lomnes | |
| 2003/0079132 A1 | 4/2003 | Bryant | |
| 2003/0195995 A1 | 10/2003 | Tabbara | |
| 2004/0267716 A1 * | 12/2004 | Prabu | G06F 8/61 |
| 2005/0081186 A1 | 4/2005 | Tigani et al. | |
| 2005/0216535 A1 | 9/2005 | Saika et al. | |
| 2006/0117172 A1 * | 6/2006 | Zhang | G06F 9/4416 713/2 |
| 2007/0067151 A1 * | 3/2007 | Fiedler | G06F 9/455 703/25 |
| 2007/0067258 A1 | 3/2007 | Theilmann | |
| 2007/0088799 A1 | 4/2007 | Luft et al. | |
| 2007/0240145 A1 | 10/2007 | Saroj et al. | |
| 2007/0283332 A1 | 12/2007 | Wu | |
| 2009/0083733 A1 | 3/2009 | Chen et al. | |
| 2010/0011203 A1 * | 1/2010 | Dickens | G06F 8/63 713/2 |
| 2012/0297034 A1 | 11/2012 | Zhu | |
| 2013/0185714 A1 | 7/2013 | Chen et al. | |

OTHER PUBLICATIONS

U.S. Appl. No. 12/235,777, Final Office Action, dated Apr. 4, 2012, 24 pg.
U.S. Appl. No. 12/235,777, Notice of Allowance, dated Sep. 19, 2012, 14 pg.
U.S. Appl. No. 12/235,777, Notice of Allowance, dated Dec. 4, 2012, 10 pg.
U.S. Appl. No. 12/235,777, Corrected Notice of Allowance, dated Jan. 9, 2013, 11 pg.
U.S. Appl. No. 13/788,139, Non-Final Office Action, dated Jul. 11, 2014, 21 pg.
U.S. Appl. No. 13/788,139, Non-Final Office Action, dated Dec. 23, 2014, 14 pg.
U.S. Appl. No. 13/788,139, Final Office Action, dated Jul. 27, 2015, 19 pg.
U.S. Appl. No. 13/788,139, Non-Final Office Action, dated Dec. 4, 2015, 13 pg.
U.S. Appl. No. 13/788,139, Final Office Action, dated May 20, 2016, 18 pg.
U.S. Appl. No. 13/788,139, Non-Final Office Action, dated Oct. 27, 2016, 18 pg.
U.S. Appl. No. 13/788,139, Final Office Action, dated Apr. 21, 2017, 25 pg.
U.S. Appl. No. 13/788,139, Notice of Allowance, dated Dec. 4, 2017, 7 pg.

* cited by examiner

FIG. 4

Address mapping table
*400*

| 0001A....<br>Local | 0002B....<br>Local | | | 0008I....<br>Non-local | 0009J....<br>Non-local |
|---|---|---|---|---|---|
| | | ..... | | | |
| | | 3003C....<br>Non-local | | | |
| | | ..... | | | |
| ..... | ..... | ..... | ..... | ..... | ..... |
| | | | | 9008I....<br>Local | |
| 9001A....<br>Non-local | | | | | |

SOFTWARE INSTALLATION ONTO A CLIENT USING EXISTING RESOURCES

TECHNICAL FIELD OF THE INVENTION

The present invention relates to a network installation management technology, in particular to a method and a system for installing software such as operating systems or application programs onto clients using the network installation management technology, as well as a corresponding client.

BACKGROUND OF THE INVENTION

Software like operating systems (OS's) or application programs can be installed onto a computer either manually or automatically. For the manual method, engineers are required to take all the software-installing CDs to the client's place, and then set the operating system, install the software one by one, and configure the application server as required. Generally, the automatic method is also known as "Network Installation Management (NIM)" service. In a NIM environment, software can be remotely installed onto one or more computers through network. In particular, the NIM technology is increasingly used for installing operating systems and/or application programs onto a sophisticated mainframe computer (e.g. a client or a server) capable of processing a large amount of information.

The NIM technology provides the function of managing software installation and maintenance through network. The NIM environment consists of at least one NIM server and several clients. The NIM server provides desired resources (such as files and programs used in installing) for installing software onto clients and maintaining the software. Computers receiving resources provided by the NIM server are called NIM clients. Software installation onto the computers of the clients is achieved by creating an installation image (such as a file of "OS images").

In the NIM operating environment, the NIM server remotely boots NIM client, and copies an installation image of the software to be installed stored in the NIM server, and then installs the installation image onto the client in a remote way. Equipment supported by NIM service includes AIX (Advanced Interactive Executive, Unix OS of IBM), X-Server and so on. Presently, a lot of IT companies can provide NIM service. For instance, BMC software provides OS deployment solutions based on NIM; and Opsware provides server automatic systems.

FIG. 1 shows a typical installation process of NIM. This process is exemplified by the AIX operating system.

This process starts with step S100, and then proceeds to step S105. The original client is started or reset in step S105. For example, for an original client (also called a target client) onto which an operating system is to be installed, booting may be required; while for another client whose system recovery is to be conducted, resetting may be required.

In the next step S110, during BIOS booting process, the server checks whether the client is configured with IPL ROM (Read Only Memory) with a bootp command enabled. Here, IPL is the abbreviation for Initial Program Loader. The Bootp command stands for the Bootstrap Protocol command. This Bootstrap Protocol is based on TCP/IP, which enables a diskless workstation to get an IP address from a central server and can distribute dynamic IP addresses to diskless workstations within a LAN without requiring each user setting static IP addresses.

If the check result in step S110 shows that the IPL ROM has not enabled the Bootp, then the process proceeds to step S115. In step S115, a need for IPL ROM simulation is specified and the system fails to boot up. At this time, configuration must be performed on the client to enable the execution of Bootp command.

If the check result in step S110 shows that the client has already configured with IPL ROM, the process proceeds to step S120. In step S120, the manual interaction is desired, which is clearly indicated in the IPL ROM menu.

Then the process proceeds to step S125, wherein the target client will issue a bootp request.

Subsequently, the process proceeds to step S130. The command received is conveyed to a small-sized runtime environment. Then the process proceeds to step S135, wherein the bootstrap script is invoked to get a basic code for booting.

Then the process proceeds to step S140, wherein it will be checked whether the OS bootstrap program is obtained from the network, tape or CD-ROM.

If choosing to obtain OS bootstrap program from the network, the process proceed to step S145. Obtaining OS bootstrap program from network means the operation of getting the installation image file of the OS to be installed from NIM server through network. Here, the NIM SPOT resource is NFS. NFS allows files to be shared among computers connected to the network as if the file were on the local hard disk drive of the client. Installation of NFS files can help to configure the client, and then the OS installation image is copied from NIM SPOT to a target client (an original client). On completion of step S145, all the installation image files of the OS to be installed are completely copied to the target client.

If choosing to obtain OS bootstrap program from the tape, the process proceeds to step S150. In step S150, the target client is configured completely by the boot image carried inherently on the tape.

If choosing to obtain OS bootstrap program from CD-ROM, then use the AIX program on the CD to aid in configuring the target client.

On completion of steps S145, S150 or S155, the process proceeds to step S160. At this time, all the resources of the OS to be installed have been on the local computer. In step S160, BIOS installation script is invoked and the local computer begins to install the above-mentioned OS. Then in step S165, OS installation on the original client is finished and the OS installed thereafter can be operated.

In addition to OS, the NIM system can be used to remotely install application programs or service or the like from the server onto the client.

Specifically, in the NIM operating environment, the target client to receive server resources is required to have BIOS and support NIM. Once the client is powered on, BIOS of NIM will conduct a power on test, and then it will find the address of the NIM server which can provide the resources of the OS to be installed, according to the parameters configured in MBR (Main Boot Record). Then, BIOS boots up the original client and connects it to the NIM server. After the establishment of communication with the NIM server, authentication of the client and authorization for the client will be completed. A request is sent to the designated NIM server manually or automatically to get the "OS images" files of the OS to be installed. Here, the image files can be saved on NIM server in either a compressed format or a non-compressed format. Read the OS installation image file from the server, copy the whole file from NIM server and save it on the target client (the original client), thus the OS installation image file is remotely installed onto the client. Once the OS installation image file is installed onto the client remotely, the client needs to be rebooted and the software needs to be installed before it can really run. Compared with the OS installation in manual style, this process is automatic, but the end user still needs to wait for the completion of installation of OS and application programs before he/she could use the computer.

On the other hand, it can be seen from said installation that there is still a time delay in installing OS and/or application onto client by NIM technology. As is mentioned above, time is desired for the NIM installation. Approximately 30 minutes or more will be needed in the process of "Boot NIM→Copy installation image file→Reboot→System ready". Especially in the process in which OS installation image files are copied to the target client, all of the OS installation image files are desired to be copied to the target client in order before other operations of system boot can be done. This is one of the reasons for the time delay.

Time delay results in the poor performance of NIM in supporting some solutions to fast deployment. In some commercial applications such as bank business, disaster recovery and system backup are demanding on time spent in installation and configuration of the system. The system is expected to be installed, configured and resumed as fast as possible. If long time is spent on the installation and configuration of the system used in such fields, commercial loss will occur.

So a method, a system and a corresponding client are expected, through which time delay in software installation can be reduced or eliminated and thus fast installation of software on client is achieved by NIM technology.

SUMMARY OF THE INVENTION

To overcome the above-mentioned problems in the prior art, a method, a system and a corresponding client of the present invention are provided.

An object of the present invention is to provide a method, a system and corresponding clients, through which time delay in software installation can be reduced or eliminated and thus fast installation of software on clients is achieved by NIM technology. This solution should be well applicable to disaster recovery and server backup.

Another object of the present invention is that a target client operates with only light load. This is reflected mainly in the following aspects: the client can run immediately after power on; the process of NIM does not affect the operation of the upper-level OSs and application programs; I/O is scheduled so well that said software can run during the process of software installation.

A further object of the present invention is to provide a NIM system, a method and a corresponding client that enable the client to run smoothly and make the client free from re-booting after the installation of OS and other software.

According to the present invention, a method is provided by which software installation on the client is implemented under a NIM environment, which comprises a NIM server that provides resources desired for the installation and maintenance of software on the client and at least one said client, the method comprising:

initializing the client, wherein a virtual mapping device associated with a memory driver of the client is created;
running said software on the client;
conducting data migration operation from the NIM server to the client while running said software, wherein the migrated data is the resource data obtained from NIM server and desired for installing said software; and
the software installation being completed when all the data desired for installing said software are migrated to the memory driver of the client.

According to another aspect of the present invention, a client is provided. The client can conduct software installation in a NIM environment via a NIM server which can provide resources desired for the installation and maintenance of software on the client, said client comprising:

an initialization and software running module for initializing the client and running said software on the client, and for creating a virtual mapping device associated with a memory driver of the client;
a communication module for establishing communication between said client and said NIM server;
a memory driver for storing the resources desired for running software; and
a data migration module for conducting data migration operation from the NIM server to the client while running said software, wherein the migrated data is the resource data obtained from the NIM server and desired for installing said software; wherein, the installation of software is completed when the data migration module has migrated all the data desired for installing the software to said memory driver.

According to another aspect of the present invention, a system with which software can be installed onto a client in a NIM environment is also provided, the system comprising one or more clients and a NIM server which can provide resources desired for the installation and maintenance of software on the client(s), wherein, said client comprises:
an initialization and software running module for initializing the client and running said software on the client, and for creating a virtual mapping device associated with a memory driver of the client;
a communication module for establishing communication between said client and said NIM server;
a memory driver for storing the resources desired for running software; and
a data migration module for conducting data migration operation from the NIM server to the client while running said software, wherein the migrated data is the resource data obtained from the NIM server and desired for installing said software, and
the installation of software is completed when the data migration module has migrated all the data desired for installing the software to said memory driver, and
wherein,
said NIM server comprises a NIM server communication device, a NIM operation control device, an image reading device and a image database, wherein,
the NIM server communication device is used for establishing communication with said client, and for conveying the request for the client read resources desired for running software from the NIM server to the NIM operation control device, and
the NIM operation control device is used for controlling the image reading device to read installation image of desired resources from the image database according to the request of the client.

According to the present invention, the time delay in installing software onto a client can be reduced or eliminated and the client can run immediately after power on. The process of NIM does not affect the operation of the upper-level OSs and application programs, and I/O is scheduled so well that said software can run during the process of software installation.

BRIEF DESCRIPTION OF THE DRAWINGS

The novel features of the invention will be described below. However, the present invention, its preferred embodiment, other objectives and advantages can be better understood by reference to the detailed description of illustrative embodiments in conjunction with the accompanying drawings, in which:

FIG. 4 is an illustrative mapping table of a storage space of a memory driver for a client set according to the present invention;

DETAILED DESCRIPTION OF THE INVENTION

In the following, the preferred embodiments of the present invention will be described with reference to the accompanying drawings.

According to the present invention, to reduce or eliminate the time delay of software installation on a client in the prior art, the software to be installed can run during the initialization process of the client according to the present invention based on the NIM technology. During the initialization of the client, a virtual mapping device associated with a memory driver of the client is created, which is used for scheduling between the client's memory driver and a remote NIM server with respect to an I/O operation for running software so as to direct the I/O operation for running software to the client's memory driver or the remote NIM server. Resources desired for running said software are obtained during the process of running said software. Specifically, on one hand, determine the locations of the resources desired for running said software. If the resources for running said software are found on said client, then the resources can be acquired from the client, or otherwise they should be acquired from said NIM server. This process can be realized by intercepting the I/O operation for running said software and judging the request for I/O operation. When the I/O operation request targets operation on the client's local client (a memory driver of the client), local resources are called to run said software; when the resources requested by the I/O operation are not at the local client, the desired resources will be obtained from the NIM server which provides resources for the installation and maintenance of the software, and then continue to run said software. The desired resources can be, for example, files and programs to be used in the installation of the software. On the other hand, during the process of running software on the client, data migration operation shall be performed from the NIM server to the client, namely, migrate the resources desired for installing the software, but to be acquired from the NIM server. According to the present invention, the software is installed and the resource data desired for installing the software is migrated while the software is run. Therefore, unlike the prior art in which we must first acquire the resources desired for installing the software from the NIM server (for example, the installation images of the files and programs used for installing the software), then copy said installation images to the local client and reboot the system before finishing the installation of said software by the time the system is ready, which is quite a time-consuming process that results in a big time-delay. Systems according to the present invention can reduce or eliminate the time delay in installing software on the client.

Figure 1:
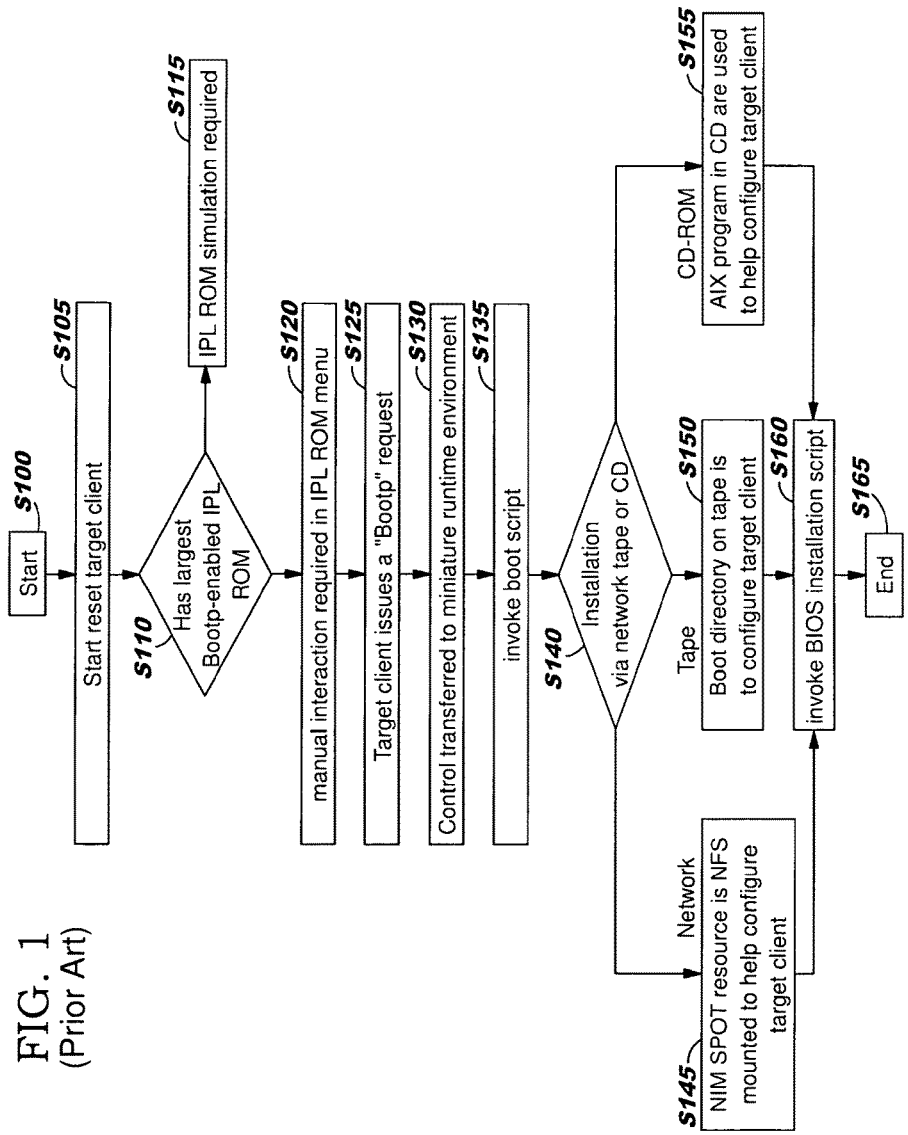
FIG. 1 shows a typical NIM installation process in the prior art.
Figure 2:
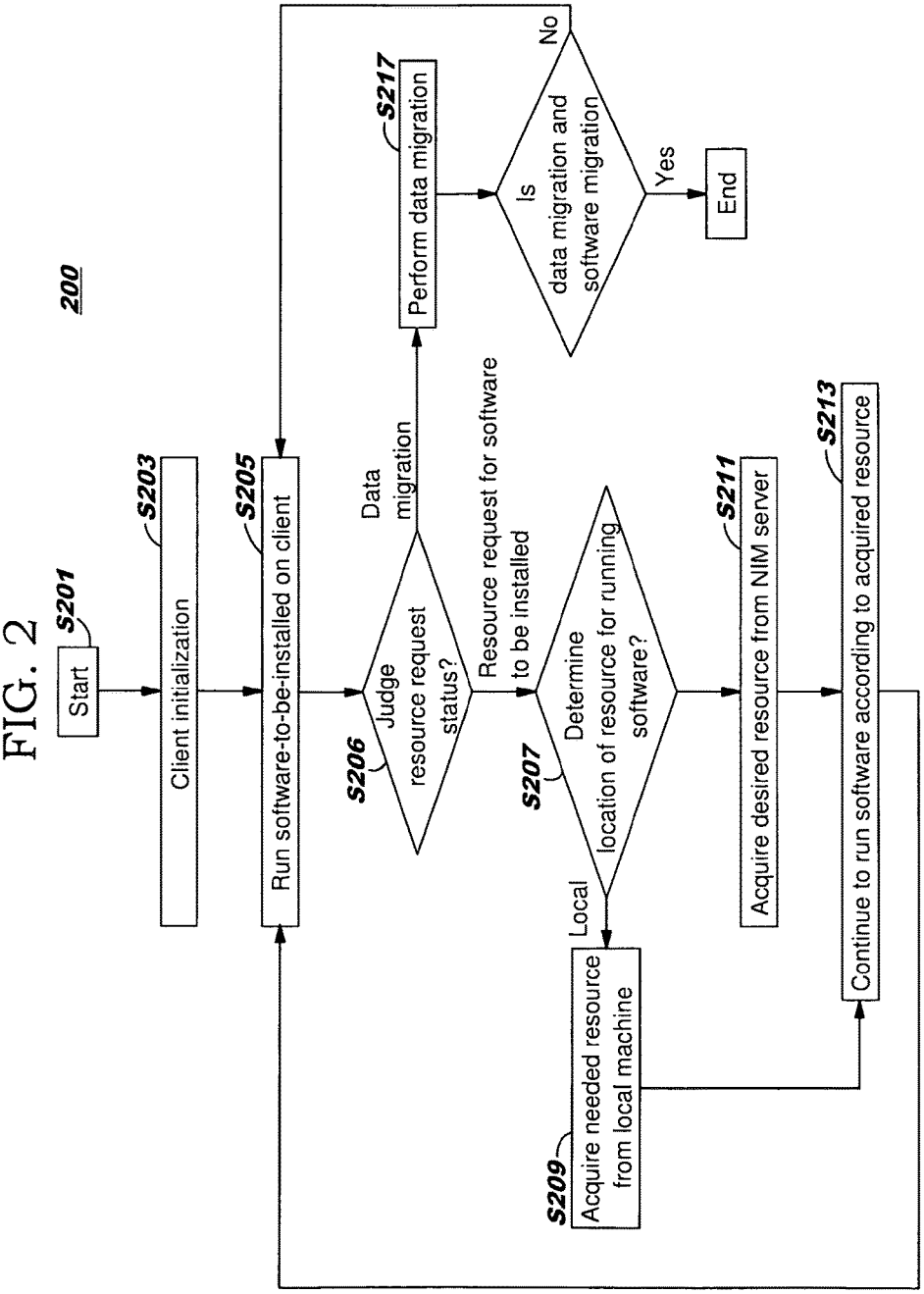
FIG. 2 is a schematic flow chart of a method 200 for installing software on a client in a NIM environment based on the principle of the present invention.

FIG. 2 is a schematic flow chart showing a method for installing software on a client in a NIM environment according to the principle of the present invention. According to the present invention, said client is a client on which software is installed based on the NIM technology. This process starts with step S201, and then proceeds to step S203. In step S203, an initialization operation is conducted on the client. It should be known that said initialization operation can include, for example, the BIOS boot process of OS or the initialization loading process for the application. A detailed description of the initialization operation of the client according to the present invention will be given in conjunction with FIG. 3.

Figure 3:
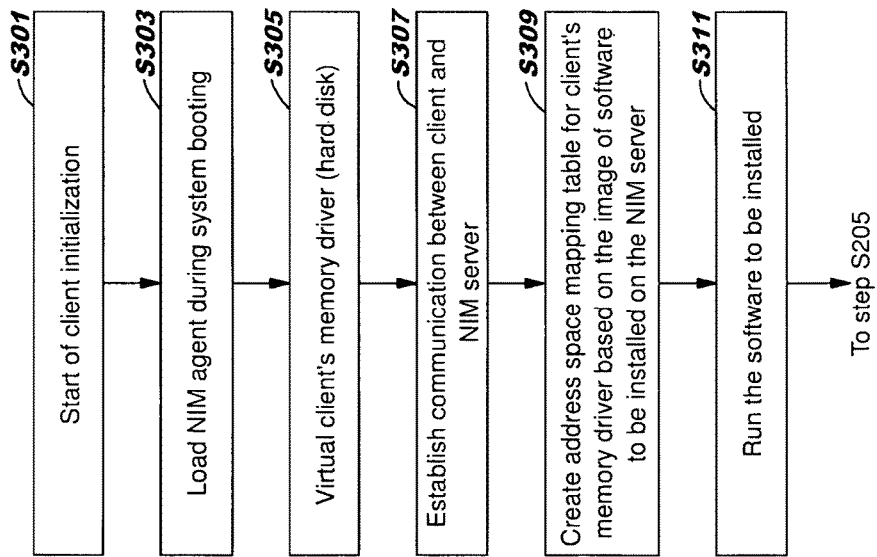
FIG. 3 is a flow chart of a client initialization process according to the present invention.

FIG. 3 is a flow chart of the initialization process of the client in the method shown in FIG. 2 implemented according to one embodiment of the present invention. Once the initialization operation begins on the client (step S301), the process proceeds to step S303. In the step S303, a NIM agent is firstly loaded when system booting is performed. During the process of subsequently running the software to be installed, this NIM agent is used to create a virtual mapping device associated with the client's local memory driver (e.g., hard disk), and to create a storage space mapping table for the local memory driver, for intercepting the I/O operation arising from running said software, for acquiring resources desired in running said software from the local client or a remote NIM server according to the intercepted I/O operation, and for migrating an installation image file from the NIM server to the client's local memory driver during software on the client being run. The operation of loading a NIM agent is known to a person skilled in the art. For instance, a NIM agent can be written into BIOS or said NIM agent can be stored in the internal memory and then be call when BIOS starts to boot thus to load the agent. Herein, the created virtual mapping device is used with respect to an I/O operation for running the software running, and for scheduling between the client's memory driver and the remote NIM server to direct the I/O operation for running said software to the client's memory driver or the remote NIM server.

When said NIM agent has been loaded, the initialization process proceeds to step S305. In this step, NIM agent is run to create a virtual mapping device associated with the client's local memory driver. Thus, the client's original memory driver is screened and the I/O operation resulted from running the software is directed to said virtual mapping device. The client can run immediately after power on; the process of NIM does not affect the operation of the higher-level OS and application; and I/O is scheduled so well that said software can start to be run during installing the software.

Then, the initialization process proceeds to step S307 and the communication between the client and the NIM server is established. As the operation of establishing communication between the client and the NIM server is familiar to a person skilled in the art, the detailed description thereof is omitted here.

Once communication between the client and the NIM server has been established, the initialization process proceeds to step S309. In step S309, an address space mapping table about the memory driver of the client is created on the basis of the installation image file on the NIM server of the software to be installed. Said mapping table is used to record the physical location of the resources desired for running the software to be installed in the NIM server or in the client's memory driver and to mark the storage status of the software to be installed in the client's memory driver. This mapping table shows the client's overall status of volume and records the physical location of the resources desired for running the software to be installed in the NIM server or the physical location of them in client's local memory driver. Herein, marking physical location of desired resources in the mapping table comprises marking which resources among the resources desired for running the software are already on the local client and which are not on the local client and therefore need to be acquired from a remote NIM server. In this embodiment, the size of the mapping table is set according to the size of the installation image file of the software to be installed on the NIM server.

Alternatively, according to another embodiment of the present invention, an address space mapping table is created initially according to a client's local memory driver before communication between the client and a NIM server is established, then said mapping table is modified on the basis of the installation image file of the software to be installed on NIM server after the communication between the client and the NIM server is established.

In addition, it should also be known that, in the two initialization methods mentioned above, step S303, in which a NIM agent is run to create a virtual mapping device associated with the client's local memory driver, can also be implemented while the mapping table is being created or after it has been created.

After the mapping table is created, the initialization process proceeds to step S311, where the software to be installed will be run, and then the process proceeds to step S205 shown in FIG. 2.

FIG. 4 is an illustrative mapping table for a client's memory driver set according to the present invention. Herein, a corresponding storage space on the local client is divided into multiple blocks in accordance with the size of the software to be installed (e.g., through the installation image of corresponding software on a NIM server), each block containing the address of the resource it corresponds to and the mark that indicates where the address locates. For example, for address 0001A . . . , resource at this address can be acquired from the client's local memory driver, and it is tagged "local"; for the address 00081 . . . , resource marked at this address is non-local and should be acquired from the NIM server, so it is tagged "Non-local". A person skilled in the art can understand that the address in the mapping table actually corresponds to the code address of the software to be installed and that the location of this code address stored in the client's local memory driver corresponds to the location of this code address stored in the installation image file on the NIM server. This guarantees that the address of each block in the mapping table represents the same address in the client's local memory driver and NIM server. This address space mapping table, for example, can be set in the way of blocks, and data can be operated in blocks thereafter. Size of the blocks can be 64K, 128K, 256K and so on. It is should be known that other ways can be adopted to mark the mapping table, and the present invention will not be limited to the particular marking methods shown in the examples.

Referring to FIG. 2 continuously, the process proceeds to step S205 after the initialization of the client is started, and then the software to be installed will run on the client. A person skilled in the art should know that, during the installation process of software such as OSs or application programs, a part of codes or resources desired for running the software, in fact, have already existed in client's local memory driver (e.g., hard disk). For instance, in the prior art, the process of installing OS through network generally is: on completion of initialization and BIOS boot, communication with the NIM server is established on the basis of the booting program for OS to be installed in the BIOS; then the installation image files of the OS to be installed are acquired from the NIM server and all the installation image files are saved locally on the clients. Said software can not run before the OS software installation is completed. A person skilled in the art should also know that, in the prior art, acquiring an OS installation image from the NIM server does not need to take existing resources on the client into account, and that during the process of running the software, resources are read sequentially from local memory driver to run the software.

Different from the prior art, in the present invention, the software to be installed is run on the basis of the existing resources on the client when the software has not been installed after the initialization process is started. A virtual mapping device is created during the initialization process. So, any I/O operation for running the software are directed to the virtual mapping device and will not exert any impact on client's original memory driver. During the process of running the software, only for those resources that do not exist in the client's local memory driver, the installation images for desired resources shall be acquired from the NIM server.

The process proceeds to step S206 after the software to be installed is run on the client. In step S206, the status of a request for resources is judged by a NIM agent. The status of resource request is classified into two types: one is for resources desired for running the software to be installed and the other is for data migration resources. As to the former, the system will perform step S207; as to the latter, the system will perform step S217.

In step S207, the storage location of the resource desired for running the software is judged. The process of this judgment is described in the following with reference to FIG. 5.

Figure 5:
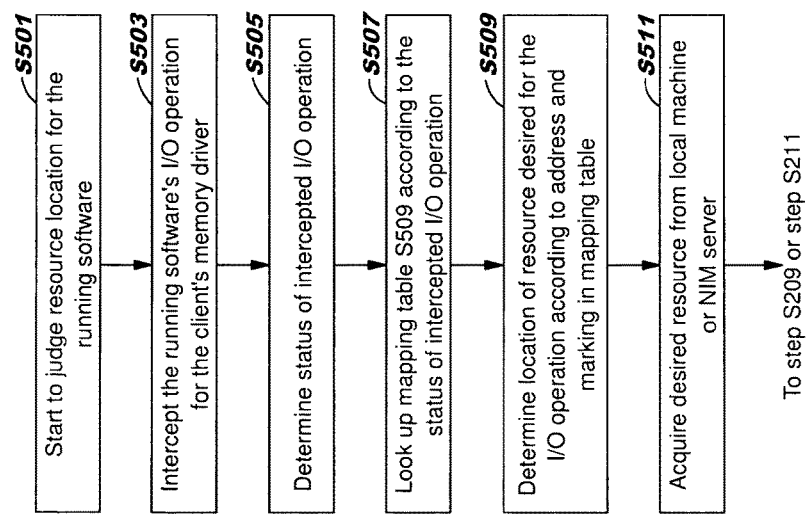
FIG. 5 is a flow chart showing a method 500 for determining the locations of the resources desired for running software in the method shown in FIG. 2 according to the present invention.

FIG. 5 is the flow chart for of determining the location of the resources desired for running the software in the method shown in FIG. 2 according to the present invention. In step S501, the operation of determining the location of the resource desired for running the software is started. Then the process proceeds to step S503. In step S503, I/O operation of the running software to client's memory driver is intercepted, and then the status of intercepted I/O operation is determined in step S505. A person skilled in the art can understand that frequent I/O operation to a local memory driver is desired when running a software. The I/O operation can be either reading or writing operation with respect to the memory driver. In the present invention, running and installing go simultaneously, so each I/O operation for the client running the software is intercepted firstly, as shown in step S503. After the status of I/O operation is determined, the process proceeds to step S507, where the preset mapping table for the client's memory driver is looked up according to the determined status of I/O operation. The mapping table records the physical location of the resources desired for running the software in the NIM server or the physical location of them in client's memory driver in the form of block locations, and marks the storage status of the software to be installed in the client's memory driver. Locations of the resources desired for I/O operation are determined in step S509 according to the addresses in the mapping table and mark therein. In step S511, the desired resources are acquired from the client or from the NIM server according to the locations of resources determined in step S509. Then the process turns back to step S209 or S211 in FIG. 2.

Figure 6:
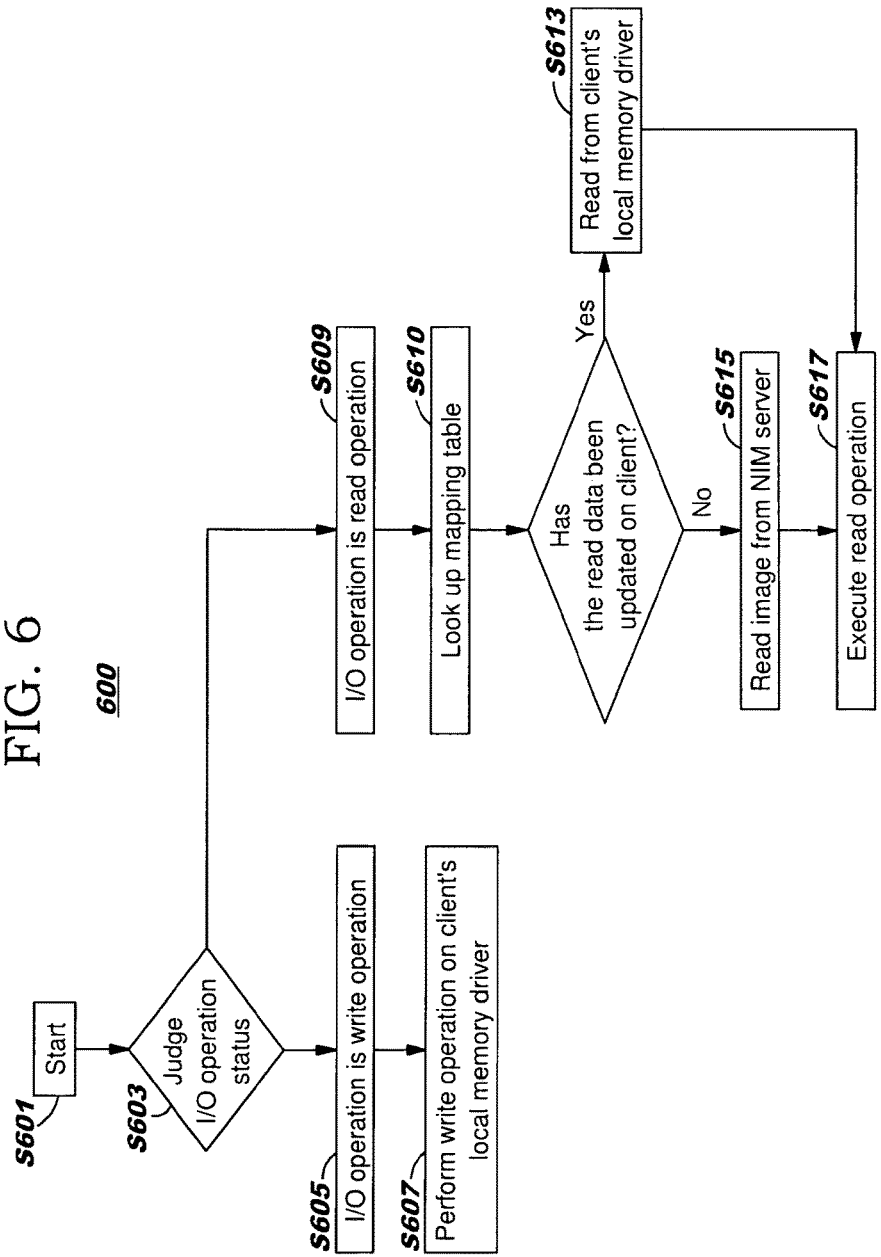
FIG. 6 is a flow chart showing a process 600 for judging the I/O operation status of running software in the method shown in FIG. 5 according to the present invention.

Specifically, the process of determining the I/O operation status in FIG. 5 is shown in FIG. 6. FIG. 6 is a flow chart that shows how to judge the I/O operation status of running the software in the method shown in FIG. 5 according to the present invention. The process of judging I/O operation status starts with step S601. Then the process proceeds to step S603 judging the I/O operation status.

In step S603, if the I/O operation status is judged to be a writing request as shown in step S605, then the process proceeds to step S607, where data desired for running the software is written to the corresponding address in the client's local memory driver and is marked in the mapping table to indicate that the data of this physical address has been in the client.

On the other hand, in step S603, if the I/O operation status is judged to be a reading request as shown in step S609, then the process proceeds to step S610, where the mapping table will be looked up to determine the storage status of data to be read in the client's memory driver. Then the process proceeds to step S611. In step S611, it is judged, on the basis of the result from looking up the mapping table, whether the data to be read is the updated data on the local memory driver. If the judging result is "Yes" (namely, the data has been updated by writing), then the process proceeds to step S613, where the desired data shall be read from the client's local memory driver and then the process proceeds to in the step S617, where the reading operation is conducted. In this case, as the data read has already existed in the client's local memory driver, the mapping table does not need to be marked. When the judgment result shows that the data to be read is not on the local client but on a remote NIM server, the process proceeds to step S615. In step S615, corresponding installation image files are read from the NIM server. Subsequently, in step S617, the reading operation is performed while the mapping table is marked. According to the mapping table, if the data to be read is judged to be on the client's local memory driver (for example, it has been copied to the local memory driver via data migration operation) and said data is identical to the data at corresponding address on the NIM server, the data can be read directly from the local client according to one embodiment of the present invention, or the data can also be read from the NIM server according to another embodiment of the present invention. On the other hand, according to one embodiment of the present invention, when the desired data is read from the NIM server, the read data is written into client's memory driver simultaneously when the reading operation is performed, and the mapping table is marked to show that the data as said address has already been stored in the local client. According to another embodiment of the present invention, the data is not simultaneously written to client's memory driver when it is being read, but migrated to client's memory driver from the NIM server via data migration operation.

Referring to FIG. 2 continuously, when the resource desired for running the software has been acquired from the local client or the NIM server, the process proceeds to step S213. In step S213, the software is run on the basis of the acquired resources and the system returns to step S205.

Figure 7:
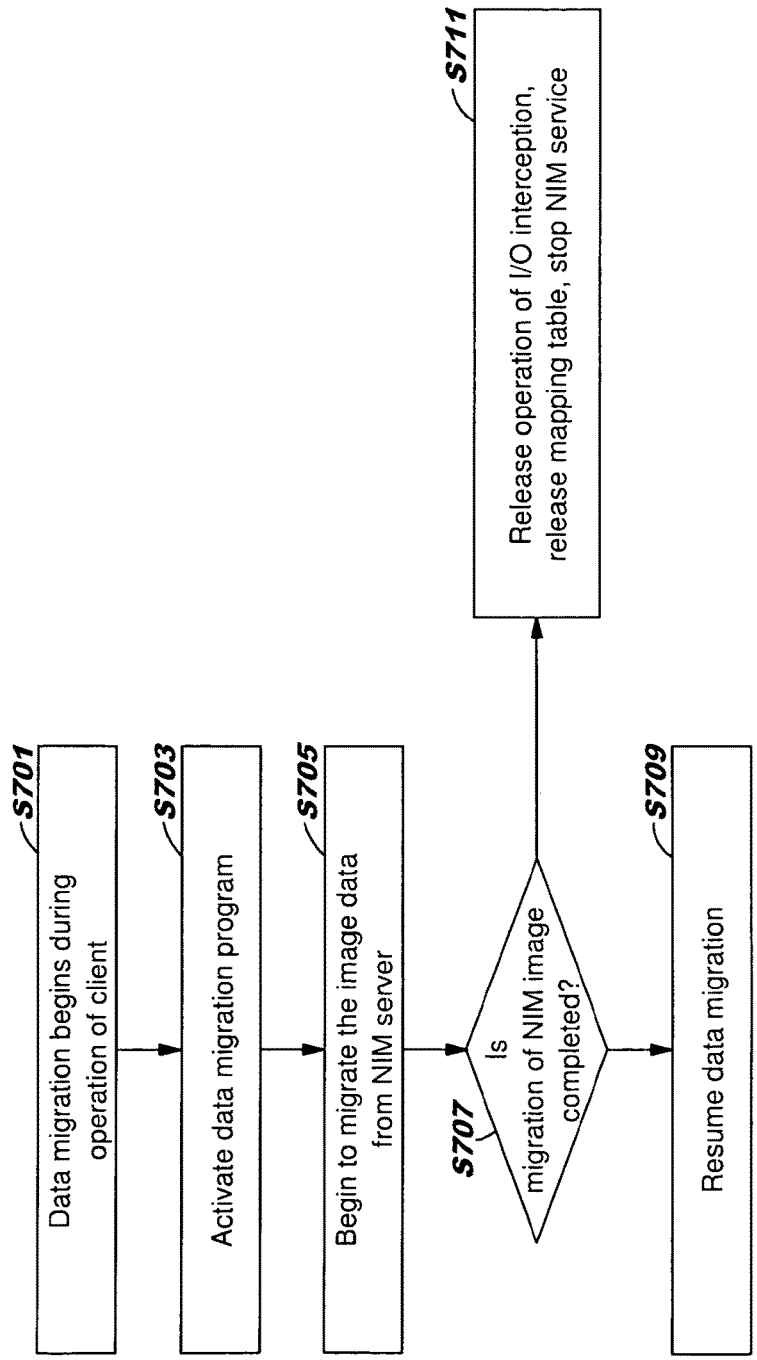
FIG. 7 is a schematic flow chart showing a process 700 of data migration operation in the method shown in FIG. 2 according to the present invention.

For a request for resource data migration, the system will carry out the data migration process in step S217. The data migration process according to the present invention is shown in FIG. 7. The data migration process starts with step S701, and then the process proceeds to step S703 where the operation of data migration is activated. Preferably, the data migration operation can be performed by running a data migration program which can be loaded, for example, in the process of the client's BIOS boot. Also, a person skilled in the art should understand that this data migration program can either be combined with a NIM agent or be a single program.

Once the data migration program is activated, the process proceeds to step S705, where the migration operation of installation image data from a NIM server begins. During the migration operation, when the NIM server is started, data of the installation image stored in the image database of the remote NIM server can be migrated continuously to the client's local memory driver. This process is similar to the traditional NIM service. The difference is in that a mapping table is introduced in the present invention to record the whole migration process in order to coordinate when, how to copy and what to copy between the local client and the remote memory. According to one embodiment of the present invention, the data migration operation is performed during the operation of the client. According to the mark (showing whether the data is on the local client) made in the mapping table, the data migration operation is conducted, with reference to the address marked as "data is not on the local client", and the installation image data at the corresponding addresses is migrated from the remote NIM server to the local memory driver. In one embodiment of the present invention, the data migration operation is conducted in blocks. It should be understood that the mapping table used in performing the data migration operation can be either the one used in running the software, or a separate mapping table which is the same as the one used in running the software. In the latter case, the two mapping tables associate with each other to mark the storage status of the client's local memory driver synchronously.

When a part of data is completely migrated, the process proceeds to step S707 where it is judged whether all the NIM installation image data has been migrated. If the judgment result in step S707 shows that not all installation image data on the NIM server has been migrated to the client's local memory driver, the process proceeds to step S711 to continue the migration of installation image data from the NIM server to the client's local memory driver and the process returns to step S705. On the other hand, if the judgment result in step S707 shows that all installation image data on the NIM server have been migrated to the client's local memory driver, the whole process of data migration is completed, which means all data desired for installing the software is on the local driver, and all locations in the mapping table have been marked as "Local". Then the process proceeds to step S709, where the intercepted I/O operation, the mapping table, the virtual mapping devices will be released, and the NIM service will be stopped. Thereafter, data access is performed on the local memory driver. After the NIM service is ended, the server runs with normal client storage I/O.

According to the present invention, the data migration operation is conducted during the operation of client, and is such an operation that the installation image data is migrated (copied) from the NIM server to the client's local memory driver. Herein, the installation image data to be migrated is the installation image data of the software to be installed on client. The migrated data can comprise, for example: data read from the NIM server but not yet written onto the local client during running the software; data desired for running the software and should be read from NIM server; and other data desired for installing the software. Certainly, if reading data from the NIM server and writing the read data onto the local client disk are performed at the same time during running the software, the migrated data will only comprise the data to be read from NIM server and desired for running the software, and other data desired for installing the software.

On completion of data migration, the step finally proceeds to step S219 shown in FIG. 2 and the software installation is completed.

According to the present invention, the data migration operation and the I/O operation performed during running the software can be conducted simultaneously or sequentially, and it is not limited to a specific performing sequence.

With reference to FIGS. 2-7, the method of installing software on a client in a NIM environment has been described above according to the principle of the present invention. On the basis of the method of installing software on a client in a NIM environment according to the principle of the present invention, a client designed on the principle of the present invention and a system which can install software on the client in a NIM environment are described in conjunction with FIGS. 8-11.

Figure 8:
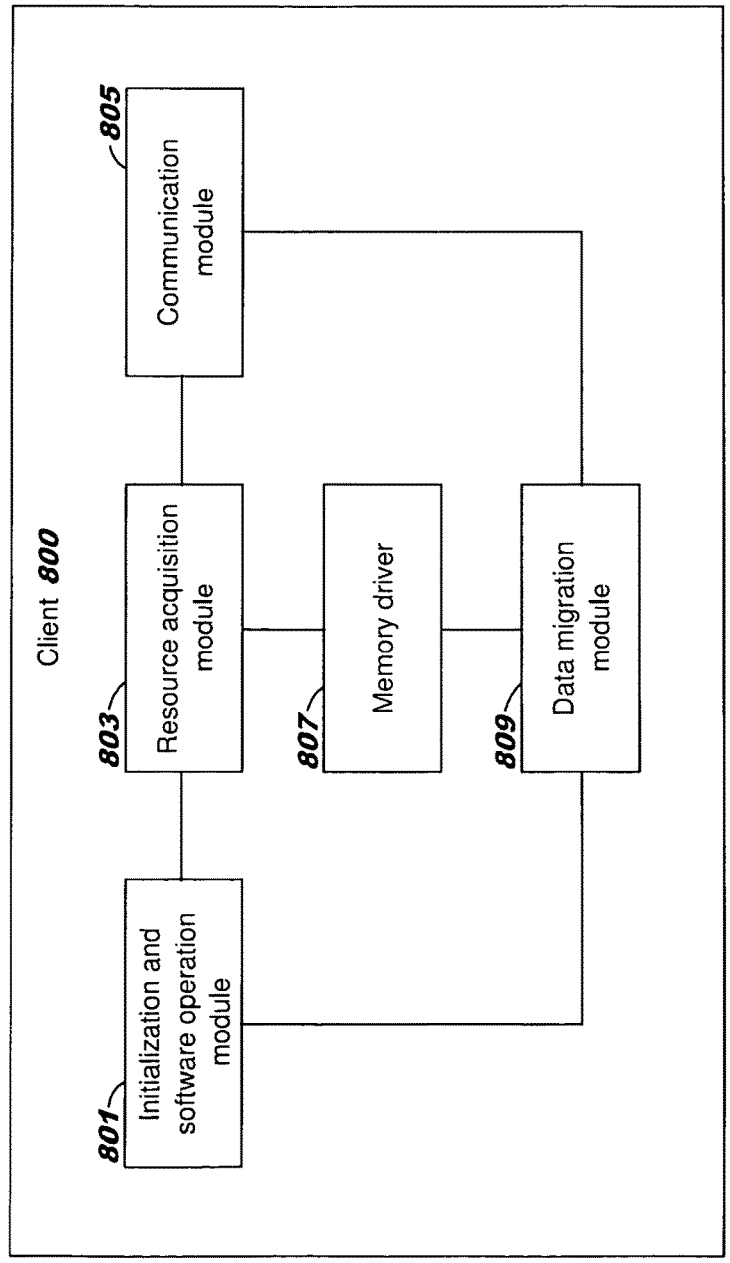
FIG. 8 is a schematically structural diagram of a client 800 which is suitable for installing software in a NIM environment according to the principle of the present invention.

FIG. 8 is a client 800 which is suitable for installing software in a NIM environment according to the principle of the present invention. A client devised according to the present invention has fundamental NIM functions and can realize the software installation through a NIM server in a NIM environment. The client 800 shown in the figure comprises an initialization and software running module 801, a resource acquisition module 803, a communication module 805, a memory driver 807 and a data migration module 809.

Herein, the initialization and software running module 801 is used for initializing said client and running said software on the client and for creating a virtual mapping device associated with the client's memory driver. The created virtual mapping device is used for scheduling between the client's memory driver and the remote NIM server with respect to the I/O operation for running the software, so as to direct the I/O operation for running said software to the client's memory driver or the remote NIM server; the communication module 805 is used for establishing communication between the client and said NIM server; the memory driver 807 is used for storing the resources desired for the running software; the resource acquisition module 803 is used for acquiring the resources desired for running the software; and the data migration module 809 is used for migrating data from the NIM server to the client. The migrated data is the resource data desired for installing the software and shall be acquired from NIM server; and the installation of said software is completed when the data migration module have migrated all the data desired for installing the software to said memory driver.

Once the client is powered on, the initialization operation will be conducted. According to the present invention, during the initialization process, the initialization and software running module 801 starts to run the software to be installed based on the existing resources on the client where the software has not been installed yet. The initialization and software running module 801 is configured to load the resource acquisition module 803 and the data migration module 809 during system booting, to instruct the resource acquisition module 803 associating the memory driver 807 with a virtual mapping device (to be described later), thus directing the I/O operation in running the software to said virtual mapping device, to instruct the communication module 805 to establish communication between the client and the NIM server, and to instruct the resource acquisition module 803 to create an address space mapping table for the memory driver 807.

Figure 9:
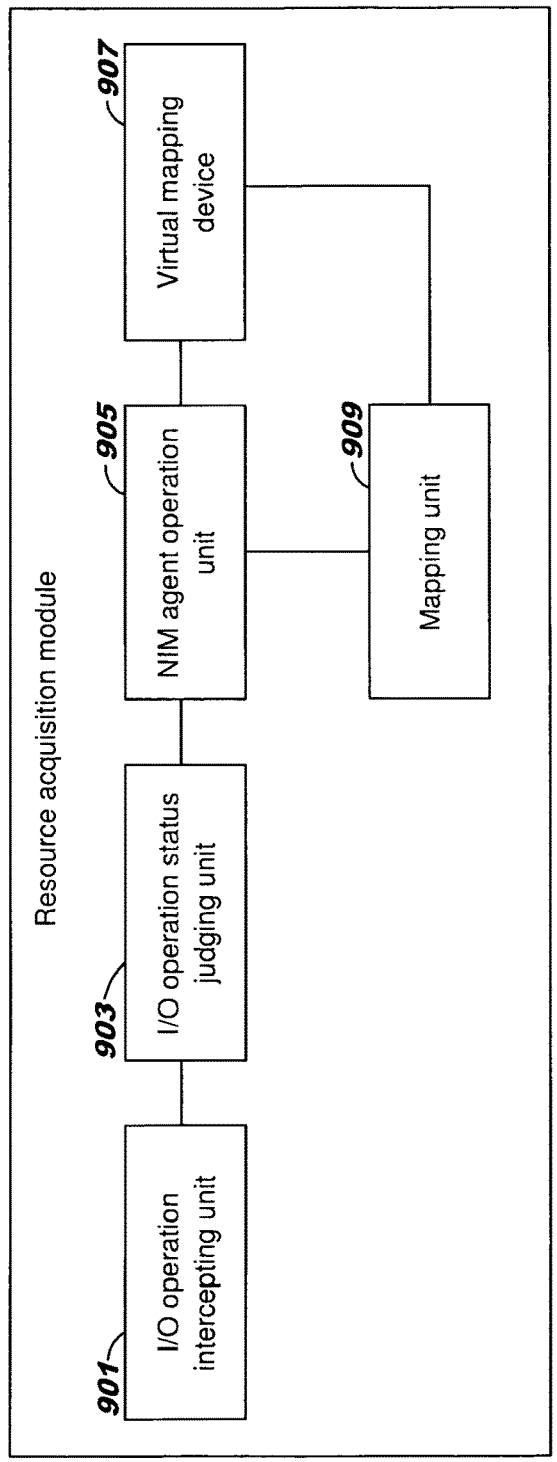
FIG. 9 is a detailed schematically structural diagram of a resource acquisition module 803 shown in FIG. 8.

FIG. 9 is a detailed schematically structural diagram of resource acquisition module 803 shown in FIG. 8. The resource acquisition module shown in FIG. 9 comprises an I/O operation intercepting unit, an I/O operation status judging unit 903, a NIM agent operation unit 905, a virtual mapping device 907 and a mapping unit 909.

Herein, according to one embodiment of the present invention, after establishing communication between the client and the NIM server, the mapping unit 909 will set a mapping table about the address space of the client's memory driver based on the installation image of the software to be installed on the NIM server. According to another embodiment, the mapping unit 909 can also preset said mapping table on the basis of the memory driver; and then modify said mapping table on the basis of the installation image of the software to be installed on the NIM server after establishing communication between the client and the NIM server. According to the invention, said mapping table is used to record the physical addresses of resources desired for running the software to be installed on the NIM server or in the client's memory driver and to mark the storage status of the software to be installed in client's memory driver. Preferably, said mapping table can be set on the basis of blocks.

When the client begins to run the software, said resource acquisition module starts to judge the addresses of the resources desired for running said software on the basis of the address space mapping table for the client's memory driver. Specifically, I/O operation intercepting unit 901 intercepts the I/O operation for running software to the memory driver and conveys the intercepted I/O operation to the I/O operation status judging unit 903. The I/O operation status judging unit 903 makes a judgment on the status of the intercepted I/O operation. In addition, said virtual mapping device 907 is used for scheduling between the client's memory driver and the remote NIM server with respect to the I/O operation for running the software so as to direct the I/O operation for running the software to the client's memory driver or the remote NIM server. The NIM agent operation unit is used to look up the mapping table set by the mapping unit 909 according to the determined I/O operation status and determine the locations of the resources desired for the I/O operation on the basis of the address and its mark in the mapping table.

The NIM agent operation unit 905 conducts the following procedures on the basis of the judgment result from I/O operation judging unit 903:

1) when said I/O operation judging unit 903 judges the I/O operation to be a writing request, said NIM agent operation unit 905 will directly write the data desired for running the software onto the corresponding address of said memory driver, and notify the mapping unit 909 to mark the mapping table, thus indicating that data at this physical address has been stored in the local client.

2) when said I/O operation judging unit 903 judges the I/O operation to be a reading request, said NIM agent operation unit 905 will look up the mapping table through the mapping unit 909 to determine the storage status of data to be read in the memory driver 807; when data to be read is the updated data in the memory driver 807, said data will be acquired from the memory driver 807; when the data to be read is not on the memory driver 807 and should be read from the remote NIM server, corresponding installation image is read from the NIM server through the communication module 805, and meanwhile, the mapping unit 909 will be notified to mark the mapping table correspondingly. According to the mapping table, when the data to read is judged to have been on the client's local client (copied to the local memory driver via data migration for example) and said data is identical to data at NIM server's corresponding address, according to one embodiment of the present invention, the data can be read directly from the local client; or according to another embodiment of the present invention, the data can also be read from the NIM server.

Figure 10:
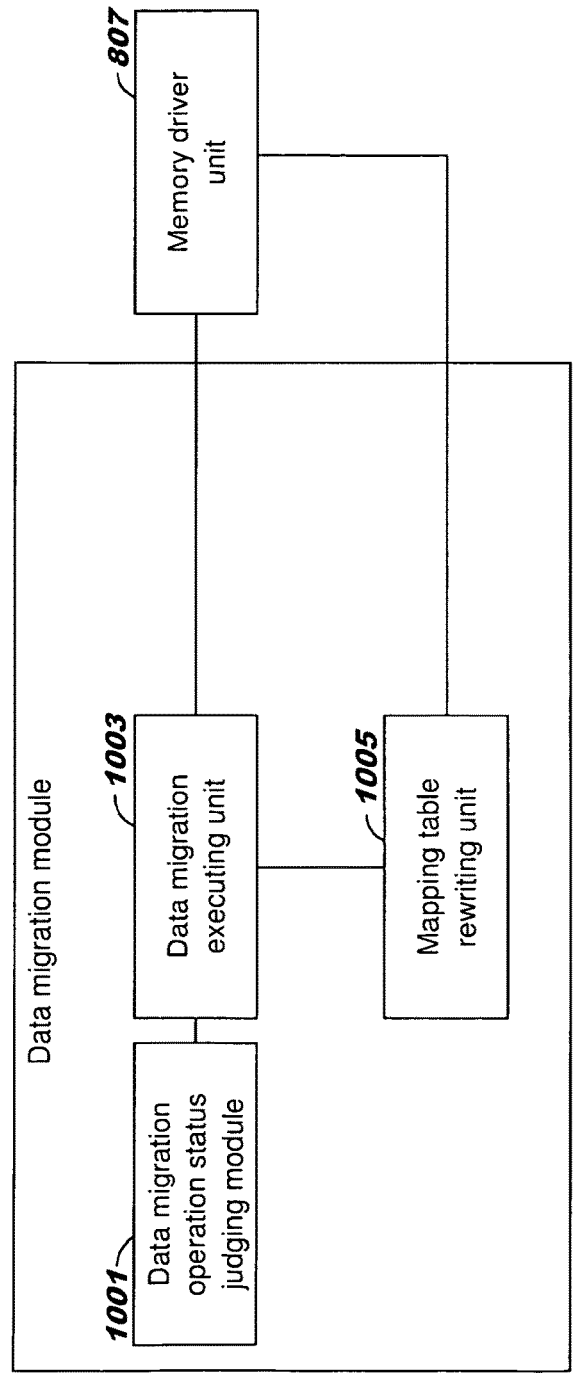
FIG. 10 is a detailed schematically structural diagram of a data migration module 809 shown in FIG. 8.

FIG. 10 is a detailed schematically structural diagram of data migration module 809 shown in FIG. 8. Said data migration module comprises: a data migration status judging unit 1001, a data migration executing unit 1003 and a mapping table rewriting unit 1005.

Herein, the data migration status judging unit 1001 is used to judge whether migration of resource data acquired from the NIM server and desired for installing said software is completed, thus to determine whether to end the data migration operation. When the data migration status judging unit 1001 judges that data migration has not been completed, said data migration executing unit 1003 will migrate the data from the NIM server to the client and store the migrated data in the memory driver 807. When the data migration status judging unit 1001 judges that the data migration operation has been completed, said data migration executing unit 1003 will terminate the data migration operation.

On the other hand, on the basis of the data migration operation executed by the data migration executing unit 1003, the mapping table rewriting unit 1005 will mark the address of data read from the NIM server as "local" in the mapping table, until all resources desired for installing the software have been migrated from the NIM server to the memory driver. When the images of software installation in the NIM server have completely been migrated to the memory driver, the data migration ends and the software installation completes. Then the data migration module 809 releases the I/O operation intercepting unit, the mapping unit and the virtual mapping device and ends the NIM service.

Figure 11:
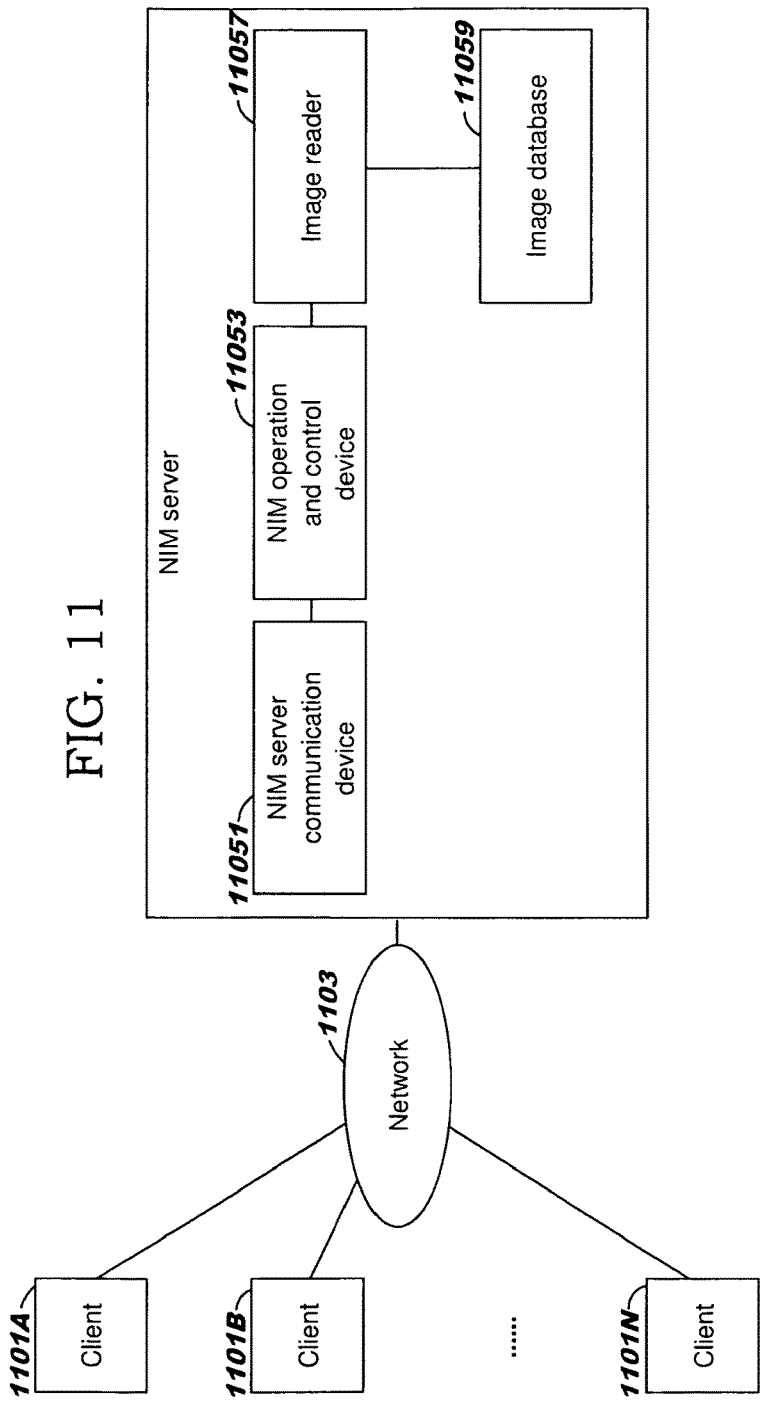
FIG. 11 is schematically structural diagram of a system 1100 for installing software on a client in a NIM environment according to the principle of the present invention.

FIG. 11 is a schematically structural diagram of a system 1100 which is used to install software on a client in a NIM environment according to the principle of the present invention.

The system shown in FIG. 11 includes one or more clients 1101A, 1101B, . . . , 1101N, and a NIM server 1105 which provides resources desired for installing and maintaining software on said clients, as well as a network 1103.

Herein, clients 1101A, 1101B, . . . , 1101N have the structure described with reference to FIGS. 8-10, so a description thereof will be omitted herein.

The NIM server 1105 according to the present invention further comprises a NIM server communication device 11051, a NIM operation control device 11053, an image reading device 11057 and an image database 11059.

Herein, the NIM server communication device 11051 is used for establishing communication with said client, and for conveying the client's request for reading resources desired for running software from the NIM server to the NIM operation control device 11053; the NIM operation control device 11053 is used for controlling the image reading device 11057 to read the installation image of desired resources from the image database 11059, according to the client's request.

Figure 12:
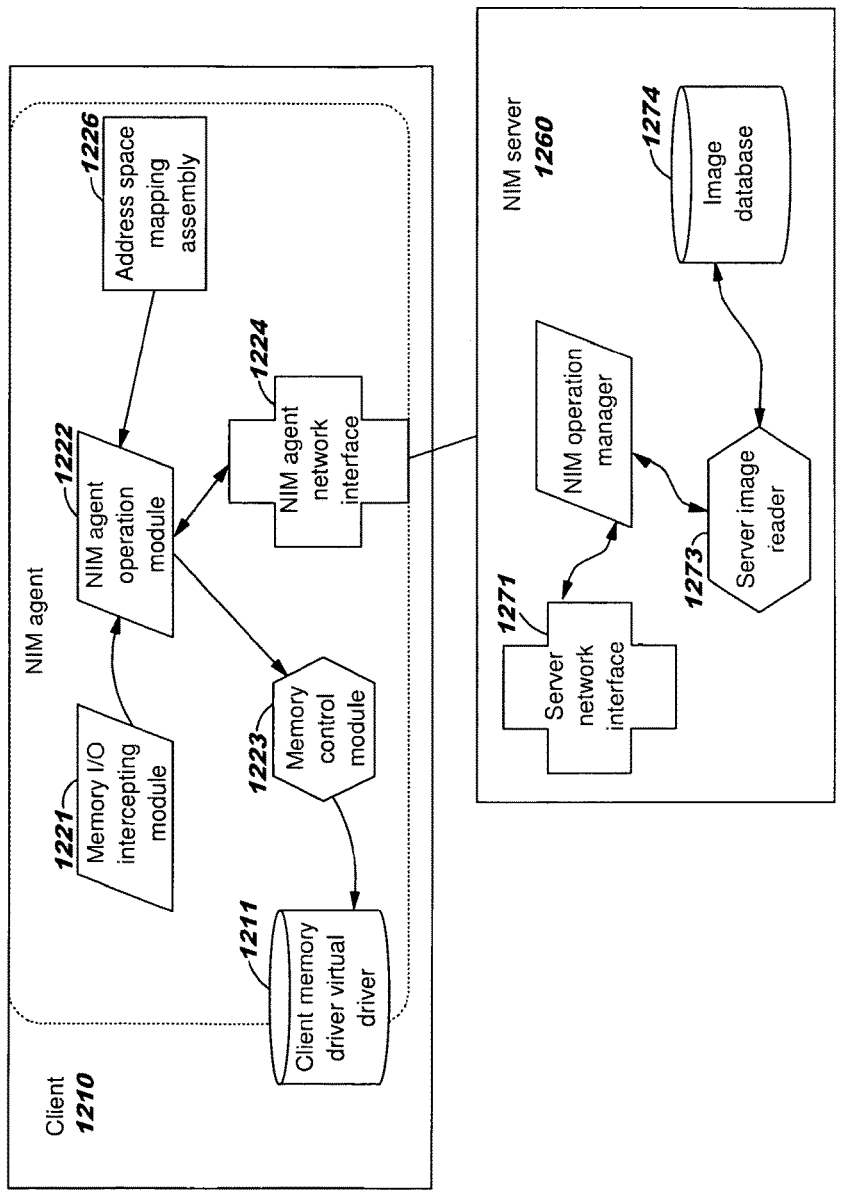
FIG. 12 is a schematic diagram showing a system 1200 for installing software on a client in a NIM environment according to a particular embodiment of the present invention.

With reference to FIG. 12 and in connection with one particular embodiment, a system for installing software on a client according to the principle of the present invention is described bellow.

FIG. 12 is a schematic diagram showing a system 1200 for installing software on a client in a NIM environment according to the present invention. The system according to the present invention can eliminate time delay in the software installation or realize the effect of "zero time delay" in the software installation.

In FIG. 12, the system 1200 comprises a client 1210 and a server 1260 that can communicate with each other through a network. The system 1200 can comprises one or more clients 1210; and the client 1210 can realize the software installation on the basis of the NIM technology. The client 1210 designed according to the present invention preferably further comprises a NIM agent 1220. The NIM agent 1220 can be, for example, an application program preset in the memory or BIOS. When the target client 1210, for example, is powered on and BIOS boot is started, the NIM agent 1220 is loaded at first, and is read by BIOS simultaneously (the process will be described in detail later). According to one embodiment of the present invention, this NIM agent 1220 preferably comprises a memory I/O intercepting module 1221, a NIM agent manipulating module 1222, a memory manipulating module 1228 and a NIM agent network interface 1224. In addition, the client 1210 of the present invention also comprises the client's address space mapping assembly 1226 and the client's memory driver/virtual mapping device 1211. In one embodiment of the present invention, said client's address space mapping assembly 1226 can be placed in the client's memory driver/virtual mapping device 1211, which is different from the above-mentioned embodiment where the client's address space mapping assembly 1226 is a separate unit. In another embodiment of the present invention, the client's memory driver/virtual mapping device 1211 can be included in the NIM agent 1220. In the system shown in FIG. 12, the server 1260 is a NIM server for providing OS resources or application resources based on the NIM technology. The NIM server comprises a server network interface 1271, a NIM operation manager 1272, a server image reader 1273 and a image database 1274. Herein, the server network interface 1271 and the agent network interface 1224 coordinate to conduct the signal interaction when establishing communication between the client and the server. The NIM operation manager 1272 is used to manage the NIM operation request from the client. The server image reader 1273 is used to read the installation image file in accordance with the instructions from the NIM operation manger 1272. The image database 1274 is used to store the installation image files of one or more software programs. For example, it parses the read request received from the client and instructs the server image reader 1273 to read corresponding installation image file in the image database and to copy the read installation image file onto the local client through the server network interface 1271.

All components of the NIM agent 1220 designed according to the present invention will be described in detail below. In said NIM agent 1220, the memory I/O intercepting module 1221, the NIM agent operation module, the memory operation module 1223 and the client network interface 1224 can be separate application programs or modules which are pre-stored in the memory or BIOS to execute relevant functions. When the target client is powered on and BIOS boot is started, the memory I/O intercepting module 1221, the NIM agent operation module, the memory operation module 1223 and the client network interface 1224 are loaded first of all.

The memory I/O intercepting module 1221 is an analogue storage module for intercepting any I/O operation of installation software on the target client during booting of the client, and for conveying the intercepted I/O operation to the NIM agent operation module 1222. In one embodiment of the present invention, when the target client begins to BIOS boot, said memory I/O intercepting module 1221 is loaded; when the target client begins to communicate with the NIM server, the module 1221 acts as a virtual mapping device, and every time the target client issues an I/O operation request, the memory I/O intercepting module 1221 will intercept said I/O operation request and store it therein while conveying the intercepted I/O operation request to the NIM agent operation module 1222.

The NIM agent operation module 1222 runs the intercepted I/O operation according to the installation status of software and maps the intercepted I/O operation request to the client's local memory driver/virtual mapping device or to the NIM server (this process will be described in detail later). In one embodiment of the present invention, said NIM agent operation module 1222 is used to judge whether data related to the I/O operation received from said memory I/O intercepting module 1221 is stored in the local client or in the remote NIM server. This process is performed by inquiring the mapping assembly 1226 through NIM agent operation module 1222.

The mapping assembly 1226 is a mapping table concerning the address space of the target client. Said mapping table is used to mark the storage condition of software to be installed in the client's memory driver. The Mapping assembly (mapping table) 1226 shows the overall volume status of the client and records the physical location of the software to be installed in the NIM server or in the local memory. The mapping assembly 1226 also marks which data desired for installing OS has already been on the client 1210 and which has not yet been written onto the client 1210 (namely, it is still in the remote NIM server). According to one embodiment of the present invention, the size of this address space mapping table is set to be as large as that of the client's hard disk when client begins to boot, or set according to the size of the OS to be installed on the target client during the system initialization. On the other hand, this address space mapping table can be set in blocks and block-based operation is performed thereafter. The size of the block can be 64K, 128K, 256K and so on. Taking this address space mapping table as an example, when BIOS is booting and the system initialization is started, some of the data of OS to be installed has been written onto a part of the addresses on the client's hard disk. These addresses for which data has been written into the address space of the target client are marked in the address space mapping table. For un-marked addresses, the data to be stored in these addresses is defaulted as stored in the NIM server. The server image reader 1273 in the NIM server 1260 reads data in blocks from the address specified in the corresponding installation image file, according to the address in the mapping table.

On one hand, if the NIM agent operation module 1222 determines that the data related to said I/O operation is in the local client by inquiring the mapping assembly 1226, it will notify the memory operation module 1223 to acquire corresponding data by inquiring the client's memory driver/virtual mapping device 1211. On the other hand, if the NIM agent operation module 1222 determines that the data related to said I/O operation is not in client (i.e., access to the NIM server is desired to acquire corresponding data) by inquiring the mapping assembly 1226, said NIM agent operation module 1222 will access the NIM server 1260 via the agent network interface 1224.

Said NIM server 1260 communicates with the agent network interface 1224 via the server network interface 1271 to receive the I/O request from the NIM agent 1210, for example, the request for reading data related to the OS to be installed. To respond to the I/O request, the NIM operation manager 1272 is responsible for the protocol with the NIM agent 1220 and controls the server image reader 1273 to read the to-be-installed image file in the image database 1274, and copies the installation image file from the NIM server 1260 to the client when marking the corresponding addresses in the mapping table as "local".

In one embodiment of the present invention, said NIM agent 1220 may also comprise a data migration module (not shown). The data migration module can also be loaded during system booting. Furthermore, when the I/O operation of installing software on the client 1210 is neither reading nor writing, the data migration module will be activated to migrate data from the installation image file to the local memory driver, to mark the migrated data as "local" in the mapping table; to release the memory I/O intercepting module and the mapping table and to end the NIM service.

It can be seen from the above description of the system and method for installing software onto clients via network that, a NIM agent is firstly loaded during the client being powered on to start the initialization of BIOS booting. Once the communication between the client and a NIM server is established, an address space mapping table of client is set. According to the address space mapping table, with respect to each I/O operation request of client, running the NIM agent involves in the real-time invoking of the installation image data acquired from the NIM server in blocks and copying the data to the local client, and at the same time the read/writing operation of installing software is conducted. This is unlike the case in the prior art which subjects to the process of "NIM boot→copying the installation image→reboot→system being ready", and in which the installation operation of systems or application programs can not be performed unless all the installation image files of OS on the server have been completely copied to the local client. Thus, "zero time-delay" of installing software is achieved according to the present invention.

In one embodiment of the present invention, for a client on with software is installed according to the present invention, a recovery file (Backup file) of the installed software is created after the completion of data migration. The recovery file preferably comprises all installation image files of OSs and application programs installed on the client. When a disaster recovery is to be performed due to the client's failure, the recovery file can be invoked directly during the client being powered on to start BIOS booting, to quickly recover the damaged software.

The system and method of the present invention for installing software on a client via network has been illustratively described above with reference to accompanying drawings. It should be understood that the illustrative description is given only for being helpful for a person skilled in the art to understand the principle of the present invention, and is not intended to limit the present invention in any way.

A person skilled in the art can appreciate that embodiments of the present invention can be provided in the form of different methods, systems and computer programs. So the present invention can be implemented by software, hardware and a combination of hardware and software. A typical combination of hardware and software can be a general computer system with computer programs, where when the programs are loaded and executed, the computer system will be controlled to execute the above-mentioned method.

The present invention can be embedded in the computer program products and it includes all the features with which said method can be embodied. Said computer program products are contained in one or more computer-readable storage media (including, but not limited to, disk memory, CD-ROM, optical memory and so on), which contain computer-readable program codes. The present invention has been described with reference to flow charts and/or block diagrams of the method, system and computer program products according to the invention. Each block and combination of blocks in these flow charts and/or block diagrams can obviously be realized by computer program instructions. These computer program instructions can be provided to general computers, special-purpose computers, embedded processors or other programmable digital processors to create a machine, thus giving an instruction (through computers or other programmable digital processors) to establish a device that realizes the functions specified in one or more blocks of these flow charts and/or block diagrams.

These computer program instructions can be also stored in one or more ROMs of the computer. Each of the ROMs can instruct the computer or other programmable digital processing equipments to function in a specific way, and hence a product is created by the instructions stored in the computer-readable memory. The products include an instruction device which can realize the functions specified in one or more blocks of these flow charts and/or block diagrams.

Computer program instructions can also be loaded onto one or more computers or other programmable digital processing equipments to enable a series of operations on said computers or other programmable digital processing equipments, and hence to realize the steps in one or more blocks of these flow charts and/or block diagrams.

In the above, the principle of the present invention is illustrated through preferred embodiments of the present invention. These embodiments described herein are only for the purpose of illustration and should not be intended to limit the present invention in any way. A person skilled in the art can make various changes and modifications to the present invention without departing from the spirit and scope of the present invention as defined by the appended claims.

What is claimed is:

1. A computer-implemented method, comprising:
   receiving, by a client hardware device, software code for executing the software;
   initializing installation of the software on the client hardware device;
   executing, by the client hardware device and responsive to the initializing, the software code;
   migrating, from a Network Installation Management (NIM) server and during the executing the software code, resource data separate from the software code to the client hardware device;
   completing, during the executing the software code and using the migrated resource data, the installation;
   creating, in the client hardware device and during the initializing, a virtual mapping device associated with a memory driver of the client;
   intercepting an I/O operation for running the software; and
   redirecting the intercepted I/O operation to the virtual mapping device.

2. The method of claim 1, wherein
   the virtual mapping device is configured to:
     identify a resource requested by the I/O operation,
     determine whether the resource is available within the client hardware device or within the NIM server,
     obtain, responsive to a determination that the resource is available within the NIM server, the resource from the NIM server, and
     obtain, responsive to a determination that the resource is available within the client hardware device, the resource from the client hardware device.

3. The method of claim 1, wherein
   the migrated resource data is requested by the virtual mapping device in response to determinations that
     the intercepted I/O operation requested the resource data, and
     the resource data is not found within the client hardware device.

4. The method of claim 1, wherein
   the virtual mapping table is configured to identify data for the installation of the software as local or non-local.

5. The method of claim 1, wherein
   the resource data is used to install the software.

6. A client hardware device, comprising:
   a memory driver; and
   a hardware processor configured to execute the following operations:
     receiving, by the client hardware device, software code for executing the software;
     initializing installation of the software on the client hardware device;
     executing, by the client hardware device and responsive to the initializing, the software code;
     migrating, from a Network Installation Management (NIM) server and during the executing the software code, resource data separate from the software code to the client hardware device;
     completing, during the executing the software code and using the migrated resource data, the installation;

creating, in the client hardware device and during the initializing, a virtual mapping device associated with a memory driver of the client;
intercepting an I/O operation for running the software; and
redirecting the intercepted I/O operation to the virtual mapping device.

7. The client hardware device of claim 6, wherein the virtual mapping device is configured to:
identify a resource requested by the I/O operation,
determine whether the resource is available within the client hardware device or within the NIM server,
obtain, responsive to a determination that the resource is available within the NIM server, the resource from the NIM server, and
obtain, responsive to a determination that the resource is available within the client hardware device, the resource from the client hardware device.

8. The client hardware device of claim 6, wherein the migrated resource data is requested by the virtual mapping device in response to determinations that
the intercepted I/O operation requested the resource data, and
the resource data is not found within the client hardware device.

9. The client hardware device of claim 6, wherein the virtual mapping table is configured to identify data for the installation of the software as local or non-local.

10. The client hardware device of claim 6, wherein the resource data is used to install the software.

11. A computer program product, comprising:
a hardware storage device having stored therein computer usable program code,
the computer usable program code, which when executed by a client hardware device, causes the computer device to perform:
receiving, by the client hardware device, software code for executing the software;
initializing installation of the software on the client hardware device;
executing, by the client hardware device and responsive to the initializing, the software code;
migrating, from a Network Installation Management (NIM) server and during the executing the software code, resource data separate from the software code to the client hardware device;
completing, during the executing the software code and using the migrated resource data, the installation;
creating, in the client hardware device and during the initializing, a virtual mapping device associated with a memory driver of the client;
intercepting an I/O operation for running the software; and
redirecting the intercepted I/O operation to the virtual mapping device.

12. The computer program product of claim 11, wherein the virtual mapping device is configured to:
identify a resource requested by the I/O operation,
determine whether the resource is available within the client hardware device or within the NIM server,
obtain, responsive to a determination that the resource is available within the NIM server, the resource from the NIM server, and
obtain, responsive to a determination that the resource is available within the client hardware device, the resource from the client hardware device.

13. The computer program product of claim 11, wherein the migrated resource data is requested by the virtual mapping device in response to determinations that
the intercepted I/O operation requested the resource data, and
the resource data is not found within the client hardware device.

14. The computer program product of claim 11, wherein the virtual mapping table is configured to identify data for the installation of the software as local or non-local.

15. The computer program product of claim 11, wherein the resource data is used to install the software.

\* \* \* \* \*